United States Patent
Kordt et al.

(10) Patent No.: US 9,250,152 B2
(45) Date of Patent: Feb. 2, 2016

(54) METHOD AND DEVICE FOR CALIBRATING LOAD SENSORS

(75) Inventors: Michael Kordt, Hamburg (DE); Marianne Jacoba Reijerkerk, Oberschleissheim (DE)

(73) Assignee: Airbus Operations GmbH, Hamburg (DE)

( * ) Notice: Subject to any disclaimer, the term of this patent is extended or adjusted under 35 U.S.C. 154(b) by 854 days.

(21) Appl. No.: 13/399,546

(22) Filed: Feb. 17, 2012

(65) Prior Publication Data

US 2012/0215476 A1    Aug. 23, 2012

Related U.S. Application Data

(60) Provisional application No. 61/444,442, filed on Feb. 18, 2011.

(30) Foreign Application Priority Data

Feb. 18, 2011    (DE) .......................... 10 2011 004 386

(51) Int. Cl.
  *G01M 5/00*  (2006.01)
  *G01L 1/22*  (2006.01)
  *G01L 25/00*  (2006.01)

(52) U.S. Cl.
  CPC ............. *G01M 5/0016* (2013.01); *G01L 1/225* (2013.01); *G01L 25/00* (2013.01); *G01M 5/0041* (2013.01)

(58) Field of Classification Search
  CPC ................................ G01L 25/00; G01L 1/225
  USPC ................................... 702/104–107, 116–118
  See application file for complete search history.

(56) References Cited

U.S. PATENT DOCUMENTS

| 6,810,753 B2 * | 11/2004 | Valdevit et al. .......... 73/862.045 |
| 7,715,994 B1 * | 5/2010 | Richards et al. ................ 702/42 |
| 2001/0054311 A1 | 12/2001 | Hakenesch |
| 2004/0104302 A1 * | 6/2004 | Schierenbeck ................. 244/10 |

FOREIGN PATENT DOCUMENTS

| EP | 0 505 839 | 9/1992 |
| GB | 2217884 | 11/1989 |
| WO | WO 01/06827 | 2/2001 |

OTHER PUBLICATIONS

European Search Report for Application Serial No. EP 12155959 dated Jun. 11, 2012.

Molent, L.; Ogden, R.W.; Ooi, G.Y.: Development of Analytical Techniques for Calibration of F/A-18 Horizontal Stabilator and Wing Fold Strain Sensors, Australian Government, Department of Defence, Defence Science and Technology Organisation, Airframes and Engines Division. Technical Report, 1995. DSTO-TR-0205.

(Continued)

*Primary Examiner* — Phuong Huynh
(74) *Attorney, Agent, or Firm* — Jenkins, Wilson, Taylor & Hunt, P.A.

(57) ABSTRACT

A device and a method for calibrating load sensors which are provided at least one load cross-section of an aerofoil or control surface of an aircraft, the load sensors being calibrated on the basis of load coefficients ($\alpha_i$) of the load sensors, which load coefficients a calculation unit calculates by evaluating a linear system of equations formed by means of mechanical loading of the aerofoil or control surface.

16 Claims, 6 Drawing Sheets

(56) References Cited

OTHER PUBLICATIONS

Betz, Daniel; Staudigel, Lothar, Trutzel, Michael N: In: Test of a Fiber Bragg Grating Sensor Network for Commercial Aircraft Structures. In: Optical Fiber Sensors Conference Technical Digest, 2002. Ofs 2002, 15th, S, 55-58.

German Office Action for Application No. 10 2011 004 386.1 dated Jun. 24, 2013.

* cited by examiner

METHOD AND DEVICE FOR CALIBRATING LOAD SENSORS

CROSS-REFERENCE TO RELATED APPLICATIONS

This application claims the benefit of U.S. Provisional Application No. 61/444,442, filed Feb. 18, 2011 and German Patent Application No. 10 2011 004 386.1, filed Feb. 18, 2011, the entire disclosures of which are herein incorporated by reference.

FIELD OF THE INVENTION

The invention relates to a method and a device for calibrating load sensors, in particular load sensors which are provided at a load cross-section of an aerofoil or control surface of an aircraft.

In conventional aircraft, the loads and the alignment thereof with aerodynamic data are determined in a complex calibration process. This conventional calibration process requires measurements on the entire, already assembled aircraft in the final assembly line. In this case, the load measurements are calibrated on the ground by introducing loads or forces at wings or control surfaces of the aircraft, for example by means of crane equipment and the like. These load measurements in the final assembly line thus prolongs the total development time of the aircraft considerably, in particular in a time-critical phase, prior to flight trials.

SUMMARY OF THE INVENTION

An object of the present invention is therefore to provide a method and a device for calibrating load sensors, in which the calibration is shortened and at the same time qualitatively improved.

The invention provides a device for calibrating load sensors which are provided at least one load cross-section of an aerofoil or control surface of an aircraft, the load sensors being calibrated on the basis of load coefficients of the load sensors, which load coefficients a calculation unit calculates by evaluating a linear system of equations formed by means of mechanical loading of the aerofoil or control surface.

In a possible embodiment of the device according to the invention, the aerofoil or control surface of the aircraft is loaded in a plurality of loading measurements with preset mechanical transverse forces which act perpendicularly on the aerofoil or control surface.

In a possible embodiment of the device according to the invention, a total transverse force at the respective load cross-section, which force is detected by sensing during one of the loading measurements, depends on measurement signals which are supplied by the load sensors installed at the respective load cross-section, and on the load coefficients of the respective load sensors.

In a possible embodiment of the device according to the invention, the total transverse force at the respective load cross-section, which force is detected by sensing during a loading measurement, is obtained as follows from the measurement signals supplied by the load sensors:

$$Q_{Y-SL} = \sum_{i=1}^{N} \alpha_i x \varepsilon_i,$$

N being the number of load sensors provided at the respective load cross-section, $\varepsilon_i$ being the measurement signals supplied by the load sensors and $\alpha_i$ being the load coefficients or load sensitivities of the load sensors. The same approach applies analogously for bending and torsion.

In a possible embodiment of the device according to the invention, the total transverse force applied to the aerofoil or control surface during a loading measurement is formed by the sum of the transverse forces $F_i$ applied:

$$Q_{Y-SL} = \sum_{i=1}^{M} F_i,$$

M being the number of transverse forces $F_i$ applied to the respective load cross-section SL. The same approach applies analogously for bending (and torsion), the effective lever arm $l_i$ merely needing to be multiplied by the force $F_i$.

In a possible embodiment of the device according to the invention, the number of loading measurements carried out corresponds to the number of load sensors at the respective load cross-section, in such a way that the linear system of equations comprises N linear equations for determining the N load coefficients $\alpha_i$ of the load sensors for the calibration thereof.

In a possible embodiment of the device according to the invention, the linear system of equations formed is evaluated by the calculation unit after completion of the Nth loading measurement to determine the load coefficients $\alpha_i$ of the load sensors.

In a possible embodiment of the device according to the invention, the load sensors are formed by measuring bridges which can be calibrated, each comprise a plurality of strain gauges and are installed at the aerofoil or control surface of the aircraft.

These measuring bridges can, for example, be Wheatstone measuring bridges.

In a possible embodiment of the device according to the invention, during a loading measurement the aerofoil or control surface is loaded selectively at different points with mechanical transverse forces which are each introduced mechanically into the aerofoil or control surface of the aircraft, which is located on the ground, by a mechanical force introduction means, in particular a load crane, which is installed at the aerofoil or control surface.

Alternatively, during a loading measurement the aerofoil or control surface can be loaded continuously with a preset transverse load profile which is caused in each case by a corresponding flight maneuver of the aircraft, which is located in the air.

In a possible embodiment of the device according to the invention, the load sensors which can be calibrated by the device are installed at a control surface which is formed by an elevator unit or rudder unit of the aircraft.

In a possible embodiment of the device according to the invention, the load sensors are installed at the edge of a load cross-section SL formed by a wing box of the aerofoil or control surface, the wing box being limited by a front spar, a rear spar, an upper wing surface and a lower wing surface of the aerofoil or control surface.

In a possible embodiment of the device according to the invention, the load sensors installed at the aerofoil or control surface are calibrated before the aircraft is put into operation.

Alternatively, the load sensors installed at the aerofoil or control surface can be calibrated during a maintenance procedure on the aircraft.

In a further possible embodiment, the calibrated load sensors detect mechanical transverse forces which act on the respective aerofoil or control surface of the aircraft during operation of the aircraft.

In a possible embodiment of the device according to the invention, the transverse forces detected by the calibrated load sensors by sensing are compared with transverse force threshold values to determine overloading of the aerofoil or control surface during flight operation of the aircraft or when maintenance procedures are being carried out on the aircraft.

The invention also provides an aircraft comprising a device for calibrating load sensors which are provided at least one load cross-section of an aerofoil or control surface of the aircraft, the load sensors being calibrated on the basis of load coefficients of the load sensors, which load coefficients a calculation unit calculates by evaluating a linear system of equations formed by means of mechanical loading of the aerofoil or control surface.

In a possible embodiment, the load sensors are calibrated by the device in a calibration operating mode.

The invention also provides a method for calibrating load sensors which are provided at least one load cross-section of an aerofoil or control surface of an aircraft, the load sensors being calibrated on the basis of load coefficients of the load sensors, which load coefficients are calculated by evaluating a linear system of equations formed by means of mechanical loading of the aerofoil or control surface.

In a possible embodiment of the method according to the invention, the aerofoils or control surfaces are loaded in a plurality of loading measurements with preset mechanical transverse forces which act perpendicularly on the aerofoils or control surfaces.

In a possible embodiment of the method according to the invention, a total transverse force at the respective load cross-section, which force is detected by sensing during one of the loading measurements, depends on measurement signals which are supplied by the load sensors installed at the respective load cross-section, and on the load coefficients $\alpha_i$ of the respective load sensors.

In a possible embodiment of the method according to the invention, the total transverse force at the respective load cross-section, which force is detected by sensing during a loading measurement, is obtained as follows from the measurement signals supplied by the various load sensors:

$$Q_{Y-SL} = \sum_{i=1}^{N} \alpha_i x \varepsilon_i,$$

N being the number of load sensors provided at the respective load cross-section, $\varepsilon_i$ being the measurement signals supplied by the load sensors and $\alpha_i$ being the load coefficients or load sensitivities of the load sensors.

In a possible embodiment of the method according to the invention, the total transverse force applied to the aerofoil or control surface during a loading measurement is formed as follows by the sum of the transverse forces $F_i$ applied:

$$Q_{Y-SL} = \sum_{i=1}^{M} F_i,$$

M being the number of transverse forces applied to the respective load cross-section.

In a possible embodiment of the method according to the invention, the number of loading measurements carried out corresponds to the number of load sensors at the respective load-cross-section, in such a way that the linear system of equations comprises N linear equations for determining the N load coefficients of the N load sensors for the calibration thereof.

In a possible embodiment of the method according to the invention, the linear system of equations formed is evaluated by the calculation unit after completion of the Nth loading measurement to determine the load coefficients of the load sensors.

In a possible embodiment of the method according to the invention, the number of loading measurements carried out does not correspond to the number of load sensors. The system of equations which is then over- or under-determined is then solved by a least square or a maximum likelihood method. If, for example, the maximum likelihood method is used, the determination of load coefficients can be started as soon as the first pieces of measurement information are available and further optimisation can also be carried out if more than N loading measurements are available, since the incorporation of more information/measurements generally increases the accuracy.

In a further embodiment of the method according to the invention, the load sensors are formed by measuring bridges which can be calibrated, each comprise a plurality of strain gauges and are installed at the aerofoil or control surface of the aircraft.

In a possible embodiment, the measuring bridges which can be calibrated are formed by Wheatstone measuring bridges.

In a further possible embodiment of the method according to the invention, during a loading measurement the aerofoil or control surface is loaded selectively at different points with mechanical transverse forces which are each introduced mechanically into the aerofoil or control surface of the aircraft, which is located on the ground, by a mechanical force introduction means, in particular a load crane, which is installed at the aerofoil or control surface.

In a further possible alternative embodiment of the method according to the invention, during a loading measurement the aerofoil or control surface is loaded continuously with a preset transverse load profile which is caused in each case by a corresponding flight maneuver of the aircraft, which is located in the air.

In a possible embodiment of the method according to the invention, the load sensors which can be calibrated are installed at a control surface, the control surface being an elevator unit or rudder unit of an aircraft.

In a further possible embodiment of the method according to the invention, the load sensors are installed at the edge of a load cross-section formed by a wing box of the aerofoil or control surface, the wing box being limited by a front spar, a rear spar, an upper wing surface and a lower wing surface of the aerofoil or control surface.

In a possible embodiment of the method according to the invention, the load sensors installed at the aerofoil or control surface are calibrated before the aircraft is put into operation.

In a further possible embodiment of the method according to the invention, the load sensors installed at the aerofoil or control surface are calibrated after the aircraft has been put into operation, in particular during a maintenance procedure on the respective aircraft.

In a further possible embodiment of the method according to the invention, the calibrated load sensors detect, by sensing, mechanical transverse forces which act on the respective aerofoil or contact surface of the aircraft during operation of the aircraft.

In a further possible embodiment of the method according to the invention, the transverse forces detected by the calibrated load sensors by sensing are compared with transverse force threshold values to determine overloading of the aerofoil or control surface during flight operation of the aircraft.

In a further possible embodiment of the method according to the invention, the transverse forces detected by the calibrated load sensors by sensing are compared with transverse force threshold values to determine overloading of the aerofoil or control surface when a maintenance procedure is being carried out on the aircraft.

BRIEF DESCRIPTION OF THE DRAWINGS

Possible embodiments of the device according to the invention and of the method according to the invention for calibrating load sensors are described below with reference to the appended figures, in which.

DESCRIPTION OF EXEMPLARY EMBODIMENTS

Figure 1:
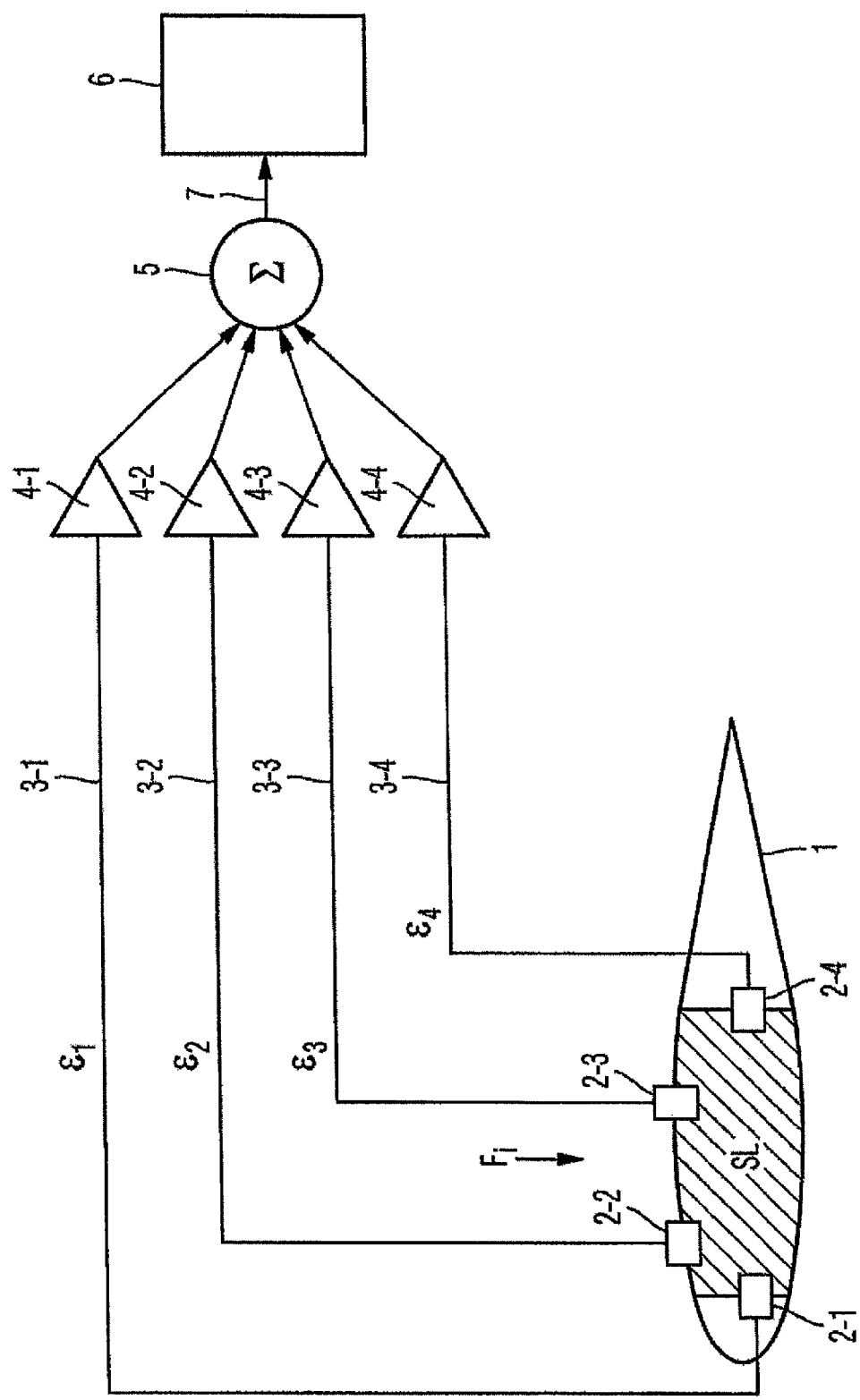
FIG. 1 is a diagram illustrating an embodiment of the device for calibrating load sensors according to the invention.

As can be seen from FIG. 1, a plurality of load sensors 2-1, 2-2, 2-3, 2-4 are provided at an aerofoil or control surface 1 of an aircraft. These load sensors 2-i can be located inside or at the edge of a load cross-section SL of the aerofoil or control surface. FIG. 1 shows a cross-section through the aerofoil or control surface having a respective load cross-section SL, in the embodiment shown the load sensors 2-i being located at the edge of a wing box of the aerofoil or control surface 1, which in the embodiment forms the load cross-section SL. This wing box is limited by a front spar, a rear spar, an upper wing surface and a lower wing surface of the aerofoil or control surface 1, as shown in FIG. 1. By installing the load sensors 2-i at the edge of the load cross-section SL, the measuring sensitivity can be increased. The load sensors 2-i supply measurement signals $\epsilon_1, \epsilon_2, \epsilon_3, \epsilon_4$ via measuring lines 3-1, 3-2, 3-3, 3-4. In the embodiment shown in FIG. 1, four load sensors 2-i are provided at the load cross-section SL. The number of load sensors can vary, for example two, three or more load sensors 2-i can be provided at a load cross-section SL. In general, the number of load sensors 2-i provided at the respective load cross-section SL is N. Starting from its base, which is mounted on the fuselage of the aircraft, the aerofoil or control surface 1 can have, up to the wing tip of the aerofoil or control surface, a plurality of load cross-sections SL which each have their own load sensors 2-i. In the embodiment shown in FIG. 1, the measurement signals $\epsilon_1$ supplied by the load sensors 2-i are amplified by signal amplifiers 4-1, 4-2, 4-3, 4-4 and added up by a summer 5. The supplied sum signal is fed to a calculation unit 6. The signal amplifiers 4-i and the summer 5 are preferably located in the aerofoil or control surface 1, in other words close to the load sensors 2-i. The summer 5 supplies the calculation unit 6 with a sum signal via a signal line 7. The calculation unit 6 can, for example, be located in a protected manner in the aircraft fuselage. The load sensors 2-i which are provided at least one load cross-section SL of an aerofoil or control surface 1 of an aircraft are calibrated by the device according to the invention, as shown in FIG. 1. In this case, the load sensors 2-i are calibrated on the basis of load coefficients $\alpha_i$ of the load sensors, which load coefficients the calculation unit 6 calculates by evaluating a linear system of equations formed by means of mechanical loading of the aerofoil or control surface 1. The load coefficients ($\alpha_i$) can, for example, be calculated in a calibration operating mode of the device. For calibration, the aerofoil or control surface 1 is loaded with mechanical forces in the calibration operating mode. In this case, the aerofoil or control surface 1 is loaded in a plurality of loading measurements with preset mechanical forces $F_i$, which act substantially perpendicularly on the aerofoil or control surface 1.

A total transverse force $Q_y$ at the respective load cross-section SL, which force is detected by sensing during the loading measurement, depends on the supplied measurement signals $\epsilon_1$ which are supplied by the load sensors 2-i installed at the respective load cross-section SL, and on the load coefficients $\alpha_i$ of the respective load sensors 2-i. As already mentioned on page 3, the same approach also applies for bending (and torsion). In a possible embodiment, a total transverse force $Q_y$ at the respective load cross-section SL, which force is detected by sensing during a loading measurement, is obtained as follows from the measurement signals $\epsilon_1$ supplied by the load sensors 2-i:

$$Q_{Y-SL} = \sum_{i=1}^{N} \alpha_i \times \varepsilon_i,$$

N being the number of load sensors 2-i provided at the respective load cross-section SL, $\epsilon_i$ being the measurement signals supplied by the load sensors 2-i and $\alpha_i$ being the load coefficients or load sensitivities of the load sensors 2-i. In the embodiment shown in FIG. 1, the number of load sensors installed at the load cross-section SL is four.

Furthermore, the total transverse force $Q_y$ applied to the aerofoil or control surface 1 during a loading measurement is formed as follows by the sum of the transverse forces $F_i$ applied:

$$Q_{Y-SL} = \sum_{i=1}^{M} F_i,$$

M being the number of transverse forces $F_i$ applied to the respective load cross-section SL.

In a further embodiment, the sensitivities are determined for each sensor on all load sections and the combination is selected for which the sensors have the greatest sensitivity.

In a possible embodiment of the device according to the invention, the number of loading measurements carried out corresponds to the number N of load sensors 2-i at the respective load-cross-section SL. For example, in the embodiment shown in FIG. 1, four loading measurements are carried out. The linear system of equations provided in a data memory of the calculation unit 6 also comprises N linear equations for determining the N load coefficients $\alpha_i$ of the N different load sensors 2-$i$ for the calibration thereof. In this case, the system of linear equations is automatically evaluated by the calculation unit 6 after completion of the Nth loading measurement to determine the load coefficients of the load sensors 2-$i$. The load sensors 2-$i$ installed at the aerofoil or control surface 1 can each be formed by a plurality of strain gauges DMS which are installed at the aerofoil or control surface 1 of the aircraft. These measuring bridges which can be calibrated may, for example, be Wheatstone measuring bridges.

In a possible variant, during a loading measurement the aerofoil or control surface 1 is loaded selectively at different points with mechanical transverse forces. In a possible implementation, the loading can be done by a mechanical force introduction means installed at the aerofoil or control surface 1. This force introduction means is, for example, a load crane which introduces forces mechanically into the aerofoil or control surface 1 of an aircraft located on the ground.

In an alternative variant, during a loading measurement the aerofoil or control surface 1 is loaded continuously with a preset transverse load profile which is caused in each case by a corresponding flight maneuver of an aircraft located in the air. In a further possible variant, a portion of the loading measurements can be carried out on the ground and another portion of the loading measurements can take place during corresponding flight maneuvers.

If, for example, the load cross-section SL comprises three load sensors 2-1, 2-2, 2-3 which are to be calibrated, then, for example, in a variant two loading measurements can take place on the ground and the third loading measurement can take place during a corresponding flight maneuver. It is also possible to carry out one loading measurement on the ground and two loading measurements during a flight maneuver. Finally, in a possible variant all loading measurements can be carried out during a corresponding flight maneuver. In each flight maneuver, a preset transverse load profile is caused at the aerofoil or control surface 1. After the aircraft has been shifted into a calibration operating mode, a flight maneuver is flown and the measurement signals produced by the resulting transverse load profile are evaluated by the calculation unit 6.

Carrying out the loading measurements during a flight maneuver makes it possible to dispense with complex ground measurements, in such a way that the aircraft is put into operation more quickly. By means of the device according to the invention, the calibration of the load sensors in the final assembly line and the alignment thereof with aerodynamic data is speeded up considerably. In the device according to the invention, the load sensors 2-$i$ installed at the aerofoil or control surface 1 are calibrated before the aircraft is put into operation. Alternatively, the load sensors 2-$i$ can also be calibrated during a maintenance procedure on the aircraft.

After successful calibration, the device can be shifted from the calibration operating mode into a normal operating mode. In this case, the calibrated load sensors 2-$i$ detect mechanical transverse forces which act on the respective aerofoil or control surface 1 of the aircraft during operation of the aircraft.

In a possible embodiment, in the normal monitoring operating mode of the aircraft, the transverse forces detected by the calibrated load sensors 2-$i$ by sensing are compared with transverse force threshold values to determine possible overloading of the aerofoil or control surface 1 during flight operation of the aircraft or when maintenance procedures are being carried out on the aircraft. If the transverse forces detected by the load sensors 2-$i$ exceed a particular transverse force threshold value which indicates the risk of possible overloading of the aerofoil or control surface, then in a possible embodiment a corresponding warning message is produced.

Figure 2:
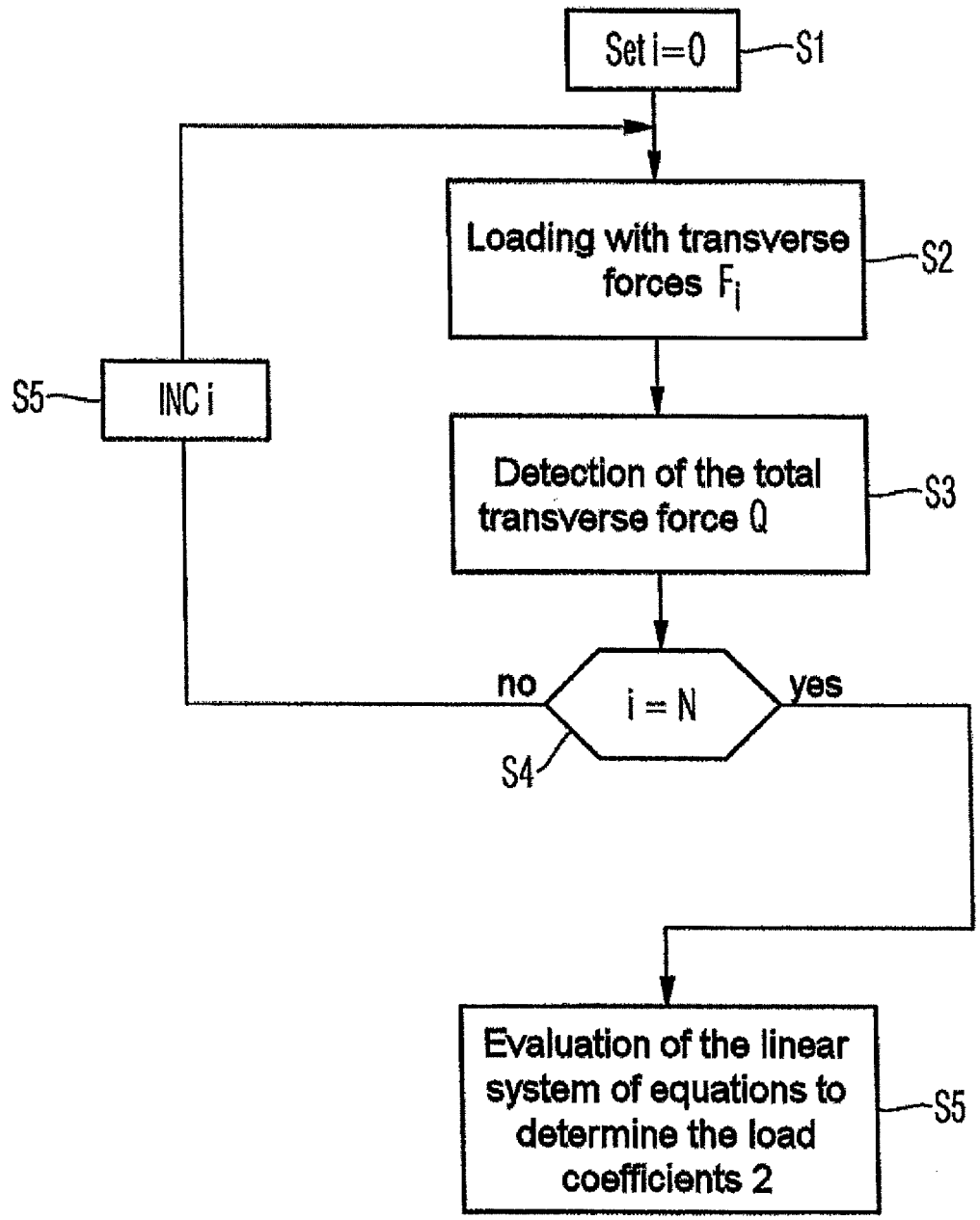
FIG. 2 is a flow chart of an embodiment of the method according to the invention for, calibrating load sensors.

FIG. 2 is a flow chart illustrating the operation of the calibration method according to the invention. The calibration method according to the invention is used to calibrate the load sensors 2-$i$ shown in FIG. 1, which are provided at a load cross-section SL of the aerofoil or control surface 1 of the aircraft. In this case, the load sensors 2-$i$ are calibrated on the basis of load coefficients $\alpha$ of the load sensors, which load coefficients are calculated by evaluating a linear system of equations LGS formed by means of mechanical loading of the aerofoil or control surface 1.

In the embodiment shown in FIG. 2, a counter which shows the number of loading measurements carried out is firstly reset in a step S1.

In a further step S2, the aerofoil or control surface 1 is loaded with preset mechanical transverse forces $F_i$ which act substantially perpendicularly on the aerofoil or control surface 1.

In a further step S3, the resulting total transverse force $Q_{Y-SL}$ is detected. This total transverse force is obtained as follows from the measurement signals $\epsilon_i$ supplied by the load sensors:

$$Q_{Y-SL} = \sum_{i=1}^{N} \alpha_i x \varepsilon_i,$$

N being the number of load sensors 2-$i$ provided at the respective load cross-section SL.

In a further step 84, it is checked whether the counter has reached the number N of sensors 2-$i$ at the load cross-section 8L which are to be calibrated. If this is not the case, the counter is incremented in step 85 and the next measuring process or the next loading measurement takes place. As soon as sufficient loading measurements have been carried out, the linear system of equations is evaluated in a step 85 to determine the load coefficients a of the different load sensors 2-$i$. For example, in the embodiment shown in FIG. 1, the system of equations is evaluated after four loading measurements have been carried out. The load coefficients a; are calculated automatically by means of the linear equations of the linear system of equations. In this case, the known transverse forces or force profiles which act during the loading measurements are taken into account. The linear system of equations is evaluated while still in calibration mode. As soon as the load sensors 2-$i$ have been calibrated, the system switches from the calibration mode into a monitoring operating mode for monitoring the forces acting on the aerofoil or control surface 1. The loading measurements carried out in steps 81-84 can be carried out either on the ground or during corresponding flight maneuvers. The linear system of equations LG8 can be evaluated either in real time or by evaluating correspondingly recorded data.

Figure 3B:
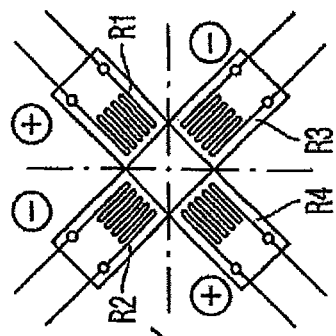
FIG. 3 shows a further embodiment showing an embodiment of the device according to the invention for calibrating load sensors.
Figure 3C:
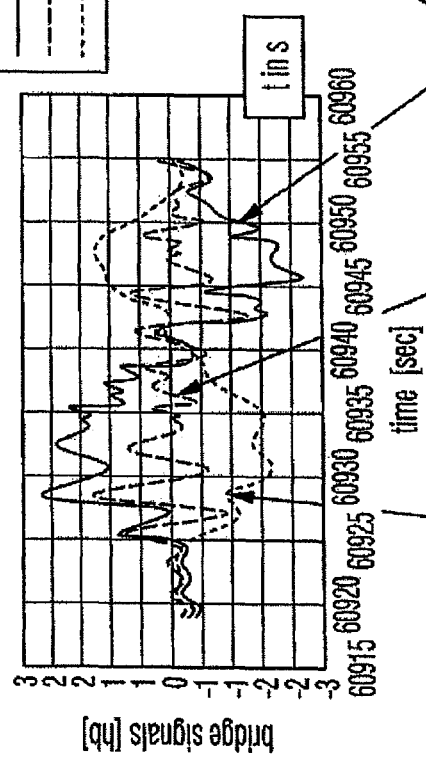
Figure 3A:
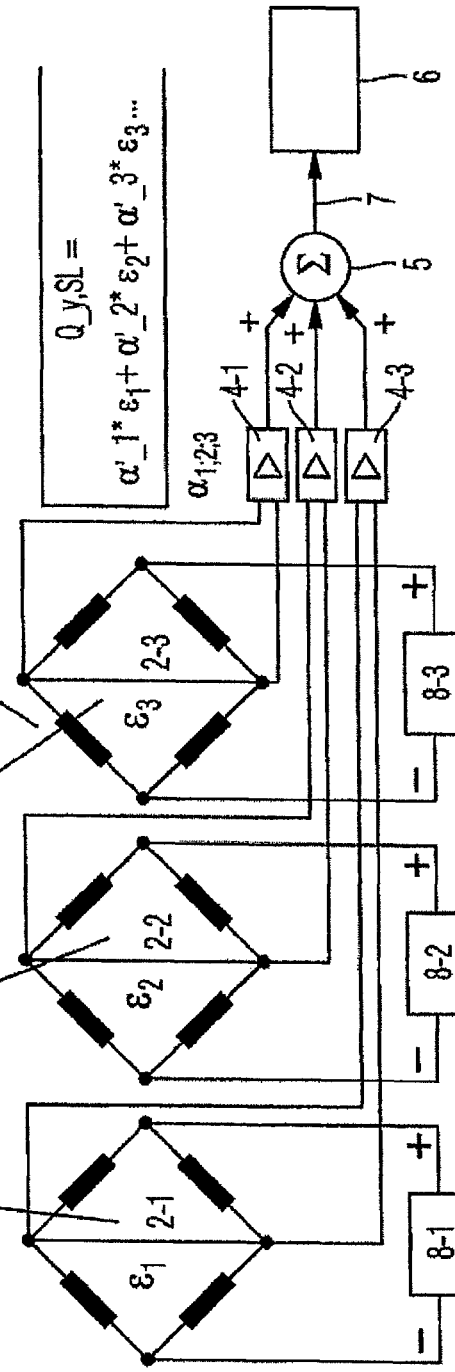

FIG. 3$a$, 3$b$, 3$c$ serve to clarify the calibration method according to the invention. In the example shown in FIG. 3$a$-3$c$, three load sensors 2-1, 2-2, 2-3, which in the example shown are each formed by measuring bridges, are each installed at a load cross-section 8L. In the example shown, these measuring bridges each comprise four strain gauges R1, R2, R3, R4 which are adapted to detect mechanical tensile stresses. The resistance of the strain gauges R1, R2, R3, R4 thus depends on the forces, in particular tensile forces, acting thereon. The measuring bridges are each supplied with current by a direct current source 8-1, 8-2, 8-3. A measurement signal E1, E2, E3 is tapped at each of the measuring bridges 2-$i$, amplified by an associated signal amplifier 4-1, 4-2, 4-3 and added up by the summer 5. FIG. 3$b$ shows an embodiment for a measuring bridge 2-$i$. The signal diagram in FIG. 3$c$ shows possible measurement signals supplied during the calibration process by the measuring bridges 2-$i$ to be calibrated. The sum signal emitted by the summer 5 is transmitted to the calculation unit 6 of the aircraft via a measuring line 7. The calculation unit 6 can, for example, be an on-board computer of the aircraft. It is also possible that during a flight maneuver the measurement signals are transmitted via an air interface or a satellite interface to a ground station for evaluation. The supplied measurement signal or sum signal can also be recorded on a data carrier for later evaluation. In a further possible embodiment, the various measurement signals supplied by the respective load sensors 2-1, 2-2, 2-3 are recorded for evaluation.

Figure 4:
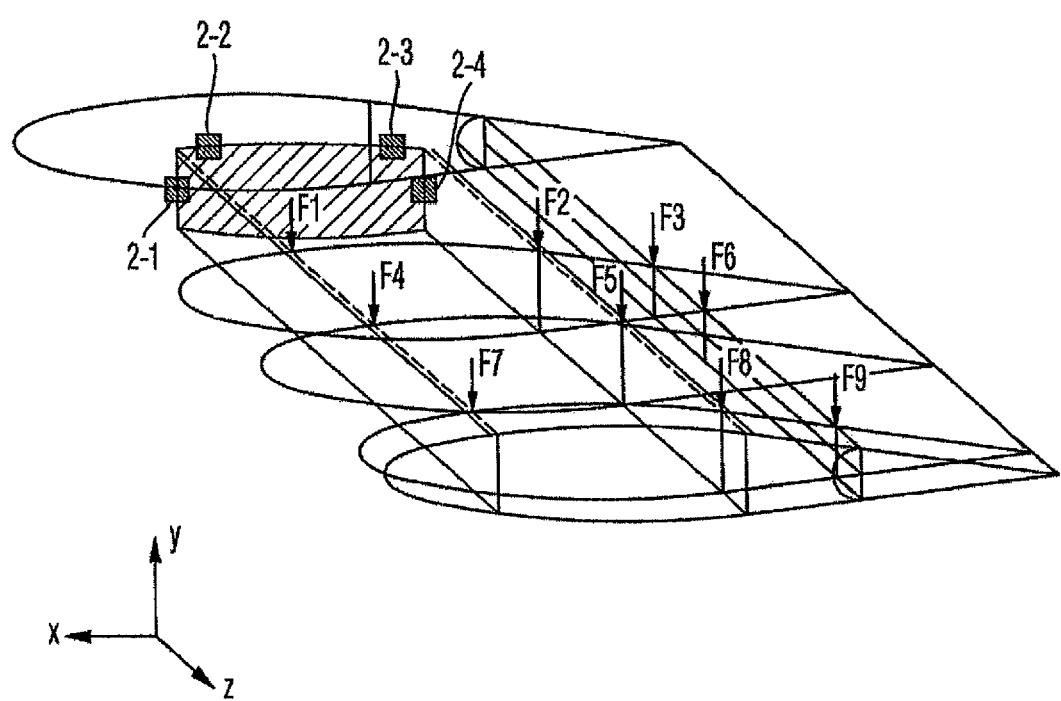
FIG. 4 is a further diagram illustrating the operation of the method according to the invention for calibrating load sensors.

FIG. 4 serves to clarify the method according to the invention. As shown in FIG. 4, in the case of an aerofoil or control surface 1, transverse load forces F1-F9 are applied to a plurality of cross-sectional areas. Load sensors 2-1-2-4, which are calibrated using the calibration method according to the invention, are installed at a load cross-section SL. In the case of the coordinates shown in FIG. 4, x is the flight direction or longitudinal direction of the aircraft, y is the height of the aircraft and z is the wing direction of the aerofoil or control surface.

When the following equation is used multiple times, the coefficients $\alpha_i$ of the load sensors or measuring bridges 2-$i$ can be determined by means of the resulting linear system of equations:

$$Q_{Y-SL} = \sum_{i=1}^{N_{SL}} F_{Lasten,SL,i},$$

the load force vector $F_{loads}$ being calculated, in a possible embodiment, by means of the following equation:

$$F_{loads} = F_{aero} - M\ddot{x}^0 - D_s\dot{x}^0 - Fg(x,x^0,u) + Rc + Ee$$

$F_{aero}$ being the aerodynamic force vector,
M being the mass matrix,
$D_s$ being the structural dynamic damping matrix,
F being the non-linear efficiency matrix,
R being the efficiency matrix of the control surfaces,
E being the engine efficiency matrix of the aircraft,
x being the state vector,
u being the input vector,
c being the control surface states and
e being the engine states.

In a possible embodiment, the parameters of the various matrices are determined using a CAE (computer-aided engineering) method by means of pressure sensors and acceleration sensors.

Figure 5A:
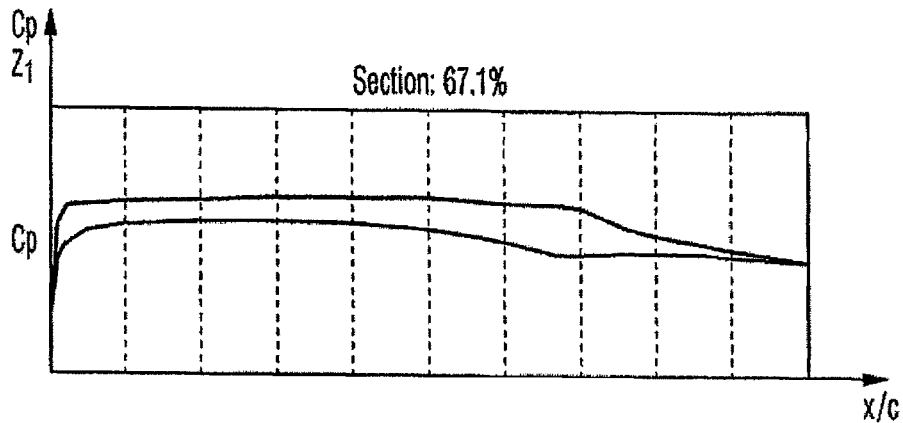
FIG. 5a, 5b, 5c are functional diagrams illustrating the operation of the method according to the invention for calibrating load sensors.
Figure 5B:
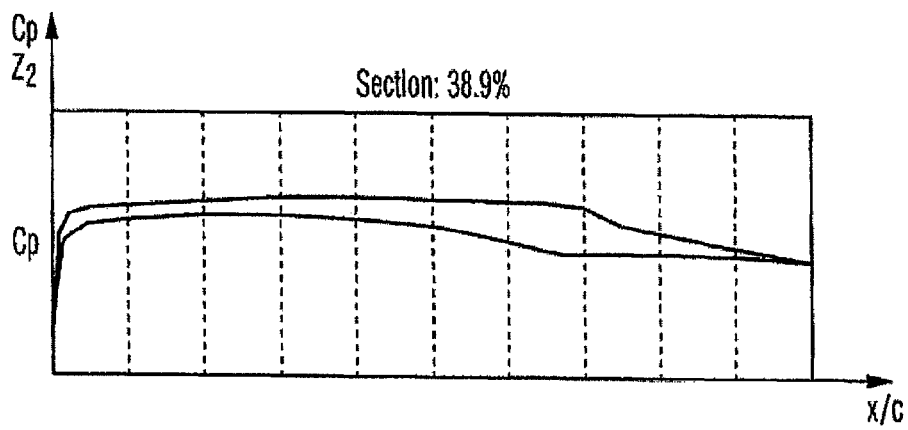
Figure 5C:
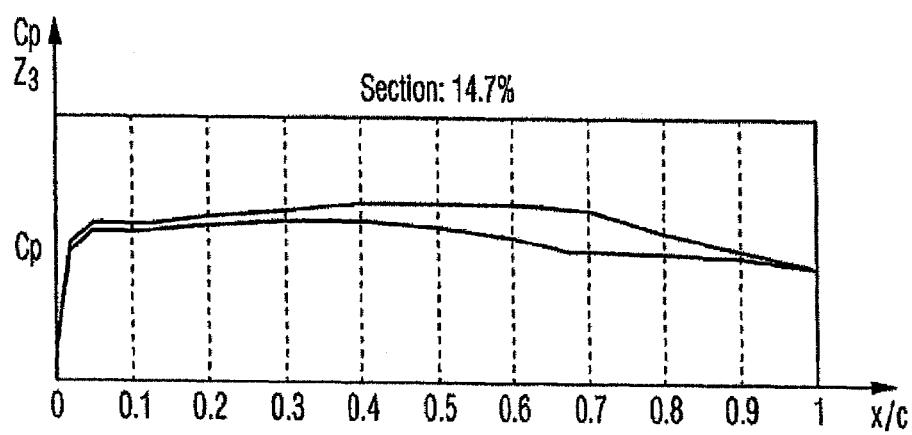

FIG. 5$a$, 5$b$, 5$c$ show the dependence of a dimensionless pressure $C_p$ for three sections at an aerofoil at different positions of the aerofoil 1, the dependence of the pressure in the x direction being shown. In each case, the upper curve shows the right-hand side and the lower curve shows the left-hand side of a vertical aerofoil, for example the rudder unit. In the case of a horizontal aerofoil, these are upper and lower faces accordingly.

During a flight test, measurements of the local pressure at the aircraft surface can be taken. These local (stationary) pressures are expressed in dimensionless form as follows:

$$C_p = (p-p_0)/(\tfrac{1}{2}*D*V^2)$$

p being the local pressure,
$p_0$ being the pressure in undisturbed flow (far upstream),
D being the density, and
V being the speed of the aircraft.

The local pressure can be plotted for an aerofoil section on the upper or lower face thereof (or on the right- and left-hand sides thereof in the case of a vertical aerofoil) as a function of the dimensionless coordinate in the depth direction x/c as shown by way of example in FIGS. 5A, 5B, 5C, 3 wing sections being shown and x/c=0 corresponding to the front edge and x/c=1 to the rear edge of the aerofoil section.

These measured pressures can be compared directly with results for the local pressures from a simulation.

Alternatively, the measured pressures in the depth direction can be integrated into a local load (for example for a section at the rudder unit: $K_Y c/c_g$), the friction forces being disregarded:

$$K_Y c/c_g = c/c_g * \int (0 \text{ to } 1)[C_{p,1} - C_{p,r}] * d(x/c)$$

$C_{p,r}$ being the pressure of the aerofoil profile upper face or the right-hand side,
$C_{p,1}$ being the pressure of the aerofoil profile lower face or the left-hand side,
g being the local depth,
$c_g$ being the geometric depth,
x being the coordinate in the depth direction of the aerofoil profile and
y being the coordinate in the thickness direction of the aerofoil profile.

Figure 6:
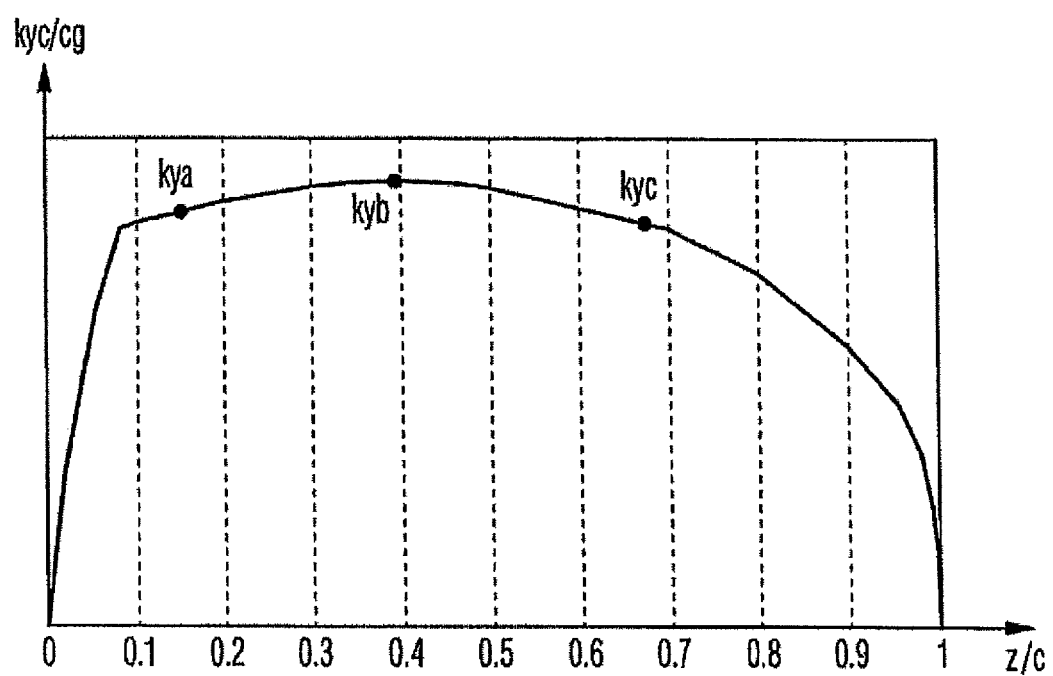
FIG. 6 is a further functional diagram illustrating the operation of the method according to the invention for calibrating load sensors.

This local load $K_Y$ can be represented as a function of the spanwise coordinate Z, as shown in FIG. 6. This local load $K_Y$ can also be compared directly with the result from a simulation. The farce $F_{aero,j}$ which acts locally on a strip j having a width $\Delta z_j/c$ can be calculated as follows:

$$F_{aero,j} = q * K_y c/c_g * \Delta z_j/c$$

z being the direction of the wingspan and
$\Delta z_j/c$ being the strip width of the wing or the aerofoil.

FIG. 6 shows various local loads $K_{YA}$, $K_{YB}$, $K_{YC}$ starting from the origin of an aerofoil 1 up to the tip of the aerofoil in the z direction.

In a possible embodiment, during a loading measurement mechanical transverse forces $F_i$ are applied selectively at different points of the aerofoil or control surface 1 and, for example, are introduced mechanically into the aerofoil or control surface 1 of an aircraft, which is located on the ground, by a mechanical force introduction means. However, in normal operation of an aircraft during flight, it is not selective forces which act on the aerofoil or control surface, but rather a transverse load profile. However, loading an aerofoil or control surface with a transverse load profile on the ground involves a certain level of technical complexity. Therefore, in a preferred embodiment of the method according to the invention, during a loading measurement the aerofoil or control surface 1 is loaded continuously with a preset transverse load profile which is caused in each case by a corresponding flight maneuver of the aircraft, which is located in the air.

In a possible variant, the measuring means for detecting load forces and transverse forces is calibrated exclusively by means of flight tests, in other words without a ground measurement. This has the advantage that complex calibration using cranes can be dispensed with and the aircraft can be supplied to clients more quickly. After successful calibration thereof, the measuring means provided at the wings can reliably detect transverse forces which act on the wing or aerofoil or control surface during operation of the aircraft. In this way it is possible, for example, to detect transverse forces which exceed a preset threshold value and, for example, to monitor by means of the calibrated measuring bridges or load sensors 2-$i$ an aerofoil or control surface 1 of the aircraft, which aerofoil or control surface is subjected to a high mechanical load or transverse force during operation of the aircraft, and to store the corresponding data for further evaluation. If a threshold value is exceeded, a person assigned to maintenance can then look in a targeted manner for noticeable structural changes in the aerofoil or control surface 1 concerned, for example for cracks which have appeared in the aerofoil or control surface 1. The measuring means calibrated in accordance with the method according to the invention for detecting transverse forces thus allow targeted maintenance and increase safety against undesirable structural changes to the aerofoil or control surface 1. In addition, the measuring means calibrated in accordance with the method according to the invention are adapted to indicate in a targeted manner to a certification authority that the wing or control surfaces 1 of the aircraft have been subjected to correspondingly high loads.

In addition, according to the invention an aircraft is provided which reads out calibrated measuring means 2-$i$ of this type during its flight operation and collects the corresponding measurement data and evaluates it during or after the flight. The method according to the invention and the device according to the invention are adapted to different aircraft, in particular passenger aircraft, but also, for example, to rotor blades of helicopters.

The invention claimed is:

1. A system for calibrating load sensors of an aircraft, comprising:
an aerofoil or control surface of the aircraft;
load sensors, which are, provided at at least one load cross-section of the aerofoil or control surface of the aircraft, the load sensors being adapted to supply measurement signals to a calculation unit; and
the calculation unit being adapted to calibrate the load sensors by load coefficients ($\alpha_i$) of the load sensors, which load coefficients are calculable, by the calculation unit, by evaluating a linear system of equations formed by mechanical loading of the aerofoil or control surface;
wherein the calculation unit is adapted to calibrate the load sensors during a loading measurement, in which the aerofoil or control surface is loaded continuously with a preset transverse load profile which is caused in each case by a corresponding flight maneuver of the aircraft located in the air.

2. The system according to claim 1, wherein the aerofoil or control surface is loaded in a plurality of loading measurements with preset mechanical transverse forces which act substantially perpendicularly on the aerofoil or control surface.

3. The system according to claim 1, wherein a total transverse force at the respective load cross-section, which force is detected by sensing during one of the loading measurements, depends on measurement signals ($\epsilon_i$) which are supplied by the load sensors installed at the respective load cross-section, and on the load coefficients ($\alpha_i$) of the respective load sensors.

4. The system according to claim 3, wherein the total transverse force ($Q_{Y\text{-}SL}$) at the respective load cross-section, which force is detected by sensing during a loading measurement, is obtained as follows from the measurement signals ($\epsilon_i$) supplied by the load sensors:

$$Q_{Y\text{-}SL} = \sum_{i=1}^{N} \alpha_i x \epsilon_i,$$

N being the number of load sensors provided at the respective load cross-section, $\epsilon_i$ being the measurement signals supplied by the load sensors and $\alpha_i$ being the load coefficients or load sensitivities of the load sensors.

5. The system according to claim 3, wherein the total transverse force ($Q_{Y\text{-}SL}$) applied to the aerofoil or control surface during a loading measurement is formed by the sum of the transverse forces applied:

$$Q_{Y\text{-}SL} = \sum_{i=1}^{M} F_i,$$

M being the number of transverse forces applied to the respective load cross-section.

6. The system according to claim 4, wherein the number of loading measurements carried out corresponds to the number of load sensors at the respective load cross-section, in such a way that the linear system of equations comprises N linear equations for determining the N load coefficients ($\alpha_i$) of the N load sensors for the calibration thereof.

7. The system according to claim 1, wherein the linear system of equations formed is evaluated by the calculation unit after completion of an Nth loading measurement to determine the load coefficients ($\alpha_i$) of the load sensors.

8. The system according to claim 1, wherein the load sensors are formed by measuring bridges which can be calibrated, each comprise a plurality of strain gauges and are installed at the aerofoil or control surface of the aircraft.

9. The system according to claim 8, wherein the measuring bridges are Wheatstone measuring bridges.

10. The system according to claim 1, wherein the control surface is formed by an elevator unit or rudder unit of the aircraft.

11. The system according to claim 1, wherein the load sensors are installed at the edge of a load cross-section formed by a wing box of the aerofoil or control surface, the wing box being limited by a front spar, a rear spar, an upper wing surface and a lower wing surface of the aerofoil or control surface.

12. The system according to claim 1, wherein the load sensors are calibrated before the aircraft is put into operation or during a maintenance procedure on the aircraft.

13. The system according to claim 1, wherein the calibrated load sensors detect, by sensing, mechanical transverse forces, bending and/or torsion acting on the respective aerofoil or control surface of the aircraft during operation of the aircraft.

14. The system according to claim 13, wherein the transverse forces detected by the calibrated load sensors by sensing are compared with transverse force threshold values to determine overloading of the aerofoil or control surface during flight operation of the aircraft or when a maintenance procedure is being carried out on the aircraft.

15. An aircraft comprising a system for calibrating load sensors according to claim 1.

16. A method for calibrating load sensors of an aircraft, the method comprising:
continuously mechanically loading an aerofoil or control surface of the aircraft with a preset transverse load profile which is caused in each case by a corresponding flight maneuver of the aircraft located in the air;

supplying measurement signals to a calculation unit by load sensors provided at at least one load cross-section of the aerofoil or control surface of the aircraft;

calculating load coefficients by the calculation unit by evaluating a linear system of equations formed by the mechanical loading of the aerofoil or control surface; and calibrating the load sensors by the load coefficients $\alpha_i$ of the load sensors during the loading measurement.

* * * * *